United States Patent
Bruno et al.

(10) Patent No.: US 10,454,926 B2
(45) Date of Patent: Oct. 22, 2019

(54) SYSTEM AND METHOD FOR CONNECTIVITY CONTEXTUAL SERVICES LOCAL ONLINE EXPERIENCE

(71) Applicant: American Express Travel Related Services Company, Inc., New York, NY (US)

(72) Inventors: John Bruno, Phoenix, AZ (US); Sibish Neelikattil Basheerahammed, Phoenix, AZ (US)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 640 days.

(21) Appl. No.: 14/515,813

(22) Filed: Oct. 16, 2014

(65) Prior Publication Data
US 2015/0381664 A1 Dec. 31, 2015

Related U.S. Application Data

(63) Continuation-in-part of application No. 14/318,091, filed on Jun. 27, 2014.

(51) Int. Cl.
*H04L 29/06* (2006.01)
*G06Q 20/12* (2012.01)
*G06Q 30/02* (2012.01)

(52) U.S. Cl.
CPC ......... *H04L 63/0861* (2013.01); *G06Q 20/12* (2013.01); *G06Q 30/0253* (2013.01)

(58) Field of Classification Search
CPC ............... G06Q 30/0239; G06Q 20/12; G06Q 30/0253; H04L 63/0861
See application file for complete search history.

(56) References Cited

U.S. PATENT DOCUMENTS

| | | |
|---|---|---|
| 5,500,890 A | 3/1996 | Rogge et al. |
| 5,991,750 A | 11/1999 | Watson |
| 6,014,636 A | 1/2000 | Reeder |
| 6,014,647 A | 1/2000 | Nizzari et al. |

(Continued)

FOREIGN PATENT DOCUMENTS

| | | |
|---|---|---|
| WO | 2014106207 | 7/2014 |
| WO | 2015102889 | 7/2015 |
| WO | 2015134947 | 9/2015 |

OTHER PUBLICATIONS

Office Action dated Apr. 14, 2017 in U.S. Appl. No. 14/469,230.

(Continued)

*Primary Examiner* — David J Stoltenberg
*Assistant Examiner* — Robert C Johnson
(74) *Attorney, Agent, or Firm* — Snell & Wilmer, L.L.P.

(57) ABSTRACT

A connectivity contextual services ecosystem management system may comprise a connectivity contextual services connectivity system, one or more user devices, and one or more merchant devices. The connectivity contextual services connectivity system may deliver different connectivity contextual services to a user device and/or a merchant device in response to a context environment, in order to provide a user with a customized experience, such as allowing that user to enter into conversations with merchants, view inventory of merchants, and search for merchants with relevant products without entering a physical store.

20 Claims, 4 Drawing Sheets

(56) References Cited

U.S. PATENT DOCUMENTS

| | | | |
|---|---|---|---|
| 6,185,683 B1 | 2/2001 | Ginter | |
| 6,965,868 B1 | 11/2005 | Bednarek | |
| 7,010,267 B2 | 3/2006 | Vanluijt et al. | |
| 7,147,149 B2 | 12/2006 | Giraldin et al. | |
| 7,254,388 B2 | 8/2007 | Nam et al. | |
| 7,353,208 B1 | 4/2008 | Stambaugh | |
| 7,364,071 B2 | 4/2008 | Esplin et al. | |
| 7,702,540 B1 | 4/2010 | Woolston | |
| 7,739,157 B2 | 6/2010 | Bonner et al. | |
| 7,926,717 B2 | 4/2011 | McIntosh | |
| 7,962,361 B2 | 6/2011 | Ramchandani et al. | |
| 8,015,088 B2 | 9/2011 | Phillips et al. | |
| 8,032,414 B2 | 10/2011 | Payne et al. | |
| 8,096,468 B2 | 1/2012 | Myers et al. | |
| 8,205,794 B2 | 6/2012 | Myers et al. | |
| 8,271,322 B2 | 9/2012 | Ariyibi | |
| 8,285,588 B2 | 10/2012 | Postrel | |
| 8,295,835 B2 | 10/2012 | Coppinger | |
| 8,369,842 B2 | 2/2013 | Proctor, Jr. et al. | |
| 8,385,896 B2 | 2/2013 | Proctor, Jr. et al. | |
| 8,423,048 B2 | 4/2013 | Morrison | |
| 8,483,714 B2 | 7/2013 | Agardh et al. | |
| 8,489,112 B2 | 7/2013 | Roeding et al. | |
| 8,533,000 B1 | 9/2013 | Pletz et al. | |
| 8,534,551 B2 | 9/2013 | Rothschild | |
| 8,538,389 B1 | 9/2013 | Evans et al. | |
| 8,567,671 B2 | 10/2013 | Myers | |
| 8,571,937 B2 | 10/2013 | Rose et al. | |
| 8,589,245 B2 | 11/2013 | Michaelis et al. | |
| 8,600,804 B2 | 12/2013 | Ramchandani et al. | |
| 8,618,932 B2 | 12/2013 | Maia et al. | |
| 8,666,891 B2 | 3/2014 | Roberts | |
| 8,676,663 B1 | 3/2014 | Robinson et al. | |
| 8,688,460 B1 | 4/2014 | Pletz et al. | |
| 8,700,530 B2 | 4/2014 | Smith | |
| 8,738,435 B2 | 5/2014 | Libman | |
| 8,740,064 B2 | 6/2014 | Griffin et al. | |
| 8,744,939 B2 | 6/2014 | Phillips et al. | |
| 8,750,868 B2 | 6/2014 | Laroia et al. | |
| 8,774,753 B2 | 7/2014 | Jabara et al. | |
| 8,798,647 B1 | 8/2014 | Haney | |
| 8,818,268 B2 | 8/2014 | Matoba et al. | |
| 8,825,085 B1 | 9/2014 | Boyle et al. | |
| 8,825,538 B2 | 9/2014 | Insolia et al. | |
| 9,015,277 B1* | 4/2015 | Slavin | G06Q 30/0243 709/217 |
| 9,326,226 B2 | 4/2016 | Bahram | |
| 9,665,881 B1* | 5/2017 | Ward | G06Q 30/0239 |
| 9,833,714 B2 | 12/2017 | Charles | |
| 2002/0147639 A1 | 10/2002 | William | |
| 2003/0028481 A1 | 2/2003 | Flitcroft | |
| 2003/0097571 A1* | 5/2003 | Hamilton | G06Q 20/00 713/182 |
| 2003/0220835 A1 | 11/2003 | Barnes | |
| 2004/0098332 A1 | 5/2004 | Dvir | |
| 2005/0049765 A1 | 3/2005 | Chetia | |
| 2005/0159863 A1 | 7/2005 | Howard | |
| 2006/0047546 A1 | 3/2006 | Taylor et al. | |
| 2006/0293967 A1 | 12/2006 | Deluca | |
| 2007/0061216 A1 | 3/2007 | Jain et al. | |
| 2007/0073582 A1* | 3/2007 | Jung | G06Q 20/06 705/14.16 |
| 2008/0109317 A1 | 5/2008 | Singh | |
| 2008/0114646 A1 | 5/2008 | Ash | |
| 2008/0262901 A1 | 10/2008 | Banga | |
| 2009/0171853 A1 | 7/2009 | Georgiou et al. | |
| 2009/0254971 A1 | 10/2009 | Herz | |
| 2010/0082446 A1 | 4/2010 | Hjelm et al. | |
| 2010/0131347 A1 | 5/2010 | Sartipi | |
| 2010/0145730 A1 | 6/2010 | Abreu | |
| 2010/0146607 A1 | 6/2010 | Piepenbrink | |
| 2010/0180009 A1 | 7/2010 | Callahan | |
| 2010/0320266 A1 | 12/2010 | White | |
| 2011/0231272 A1 | 9/2011 | Englund et al. | |
| 2011/0258049 A1 | 10/2011 | Ramer | |
| 2012/0022944 A1 | 1/2012 | Volpi | |
| 2012/0066084 A1 | 3/2012 | Sneyders | |
| 2012/0117633 A1* | 5/2012 | Chakra | H04L 9/3231 726/7 |
| 2012/0233158 A1 | 9/2012 | Braginsky | |
| 2012/0265596 A1 | 10/2012 | Mazed | |
| 2012/0324242 A1 | 12/2012 | Kirsch | |
| 2013/0204697 A1 | 8/2013 | Boal | |
| 2013/0217332 A1 | 8/2013 | Altman et al. | |
| 2013/0251216 A1 | 9/2013 | Smowton et al. | |
| 2013/0297422 A1 | 11/2013 | Hunter | |
| 2013/0325891 A1 | 12/2013 | Masood et al. | |
| 2013/0326009 A1 | 12/2013 | Morgan | |
| 2014/0046794 A1 | 2/2014 | Vallery | |
| 2014/0058841 A1 | 2/2014 | Getchius | |
| 2014/0058875 A1 | 2/2014 | Yanchenko | |
| 2014/0067516 A1* | 3/2014 | Price | G06Q 30/0222 705/14.39 |
| 2014/0108108 A1 | 4/2014 | Artman et al. | |
| 2014/0122228 A1 | 5/2014 | Wical | |
| 2014/0188733 A1 | 7/2014 | Granbery | |
| 2014/0344011 A1 | 11/2014 | Dogin | |
| 2015/0073980 A1 | 3/2015 | Griffin et al. | |
| 2015/0120558 A1 | 4/2015 | Andrews | |
| 2015/0140982 A1 | 5/2015 | Postrel | |
| 2015/0142438 A1 | 5/2015 | Dai | |
| 2015/0220924 A1 | 8/2015 | Bakker | |
| 2015/0230045 A1 | 8/2015 | Johnson | |
| 2015/0248702 A1 | 9/2015 | Chatterton | |
| 2015/0278824 A1 | 10/2015 | Zabar | |
| 2015/0302412 A1 | 10/2015 | Bhanoo | |
| 2015/0319579 A1 | 11/2015 | Syrjarinne | |
| 2015/0332240 A1 | 11/2015 | Harwood | |
| 2015/0339655 A1 | 11/2015 | Neelikattil et al. | |
| 2015/0363861 A1 | 12/2015 | Capel | |
| 2015/0379581 A1 | 12/2015 | Bruno et al. | |
| 2015/0379601 A1 | 12/2015 | Ouimet | |
| 2015/0379650 A1 | 12/2015 | Theobald | |
| 2016/0019526 A1 | 1/2016 | Granbery | |
| 2016/0019536 A1 | 1/2016 | Ortiz | |
| 2016/0063476 A1 | 3/2016 | Baldie | |
| 2016/0267480 A1 | 9/2016 | Metral | |
| 2017/0091765 A1 | 3/2017 | Lloyd | |

OTHER PUBLICATIONS

U.S. Appl. No. 14/339,284, filed Jul. 23, 2014 and entitled Systems and Methods for Proximity Based Communication.

U.S. Appl. No. 14/454,452, filed Aug. 7, 2017 and entitled System and Method for Providing a Micro Registry.

U.S. Appl. No. 15/154,106, filed May 13, 2016 and entitled Systems and Methods for Contextual Services Across Platforms Based on Selectively Shared Information.

Examination Report dated Nov. 22, 2016 in Australian Application No. 2015201925.

Examination Report dated Jan. 23, 2017 in Australian Application No. 2015201925.

Advisory Action dated Jan. 25, 2017 in U.S. Appl. No. 14/284,817.

Examination Report dated Feb. 24, 2017 in Australian Application No. 2015201925.

Final Office Action dated Mar. 16, 2017 in U.S. Appl. No. 14/454,452.

Office Action dated Mar. 24, 2017 in U.S. Appl. No. 14/318,091.

Final Office Action dated Mar. 28, 2017 in U.S. Appl. No. 14/339,284.

Pocket-lint, Apple's iBeacons explained: What it is and why it matters, retrieved from internet on Feb. 21, 2017, http://web.archive.org/web/20130925141212/http://www.pocket-lint.com/news/123730-apple-sibeacons-explained-what-it-is-and-why-it-matters> published on Sep. 25, 2013 as per WaybackMachine, 10 pages.

Office Action dated Apr. 25, 2016 in Canadian Application No. 2,888,085.

Office Action dated Aug. 12, 2016 in U.S. Appl. No. 14/454,452.

Examination Report dated Aug. 3, 2016 in Australian Application No. 2015201925.

Final Office Action dated Nov. 10, 2016 in U.S. Appl. No. 14/284,817.

Office Action dated Nov. 17, 2016 in U.S. Appl. No. 14/339,284.

(56) References Cited

OTHER PUBLICATIONS

International Search Report and Written Opinion dated Oct. 23, 2015 in Application No. PCT/US2015/041940.
International Search Report and Written Opinion dated Dec. 30, 2015 in Application No. PCT/US2015/051693.
International Preliminary Report on Patentabiliy dated Feb. 25, 2016 in Application No. PCT/US2015/041940.
Office Action dated Mar. 11, 2016 in U.S. Appl. No. 14/469,230.
International Preliminary Report on Patentabiliy dated Mar. 28, 2016 in Application No. PCT/US2015/051693.
Apple, Inc. "Getting Started with iBeacon Version 1.0," Jul. 2, 2014, entire document.
Examination Report dated Feb. 26, 2016 in Australian Application No. 2015201925.
Office Action dated Jul. 7, 2016 in U.S. Appl. No. 14/284,817.
Extended European Search Report dated Jun. 16, 2017 in European Application No. 15851256.6.
Final Office Action dated Sep. 13, 2017 in U.S. Appl. No. 14/318,091.
Final Office Action dated Oct. 2, 2017 in U.S. Appl. No. 14/469,230.
Office Action dated Oct. 2, 2017 in U.S. Appl. No. 14/454,452.
Advisory Action dated Nov. 7, 2017 in U.S. Appl. No. 14/318,091.
Office Action dated Nov. 14, 2017 in U.S. Appl. No. 14/284,817.
Advisory Action dated Nov. 17, 2017 in U.S. Appl. No. 14/469,230.
Notice of Allowance dated Jun. 27, 2018 in U.S. Appl. No. 14/469,230.
Final Office Action dated Jul. 6, 2018 in U.S. Appl. No. 14/284,817.
Advisory Action dated Jul. 30, 2018 in U.S. Appl. No. 14/318,091.
U.S. Appl. No. 16/109,046, filed Aug. 22, 2018 and titled "Transactions Using a Bluetooth Low Energy Beacon".
USPTO; Final Office Action dated Sep. 22, 2016 in U.S. Appl. No. 14/469,230.
USPTO; Advisory Action dated Nov. 4, 2016 in U.S. Appl. No. 14/469,230.
USPTO, Final Office Action dated Dec. 29, 2017 in U.S. Appl. No. 14/339,284.
USPTO, Non-Final Office Action dated Feb. 9, 2018 in U.S. Appl. No. 14/318,091.
USPTO, Advisory Action dated Feb. 15, 2018 in U.S. Appl. No. 14/339,284.
USPTO, Final Office Action dated Apr. 20, 2018 in U.S. Appl. No. 14/454,452.
Office Action dated Jan. 19, 2018 in Australian Application No. 2017201307.
Office Action dated Jul. 11, 2018 in Australian Application No. 2017201307.
Final Office Action dated Sep. 6, 2018 in U.S. Appl. No. 14/995,052.
Final Office Action dated Sep. 11, 2018 in U.S. Appl. No. 14/339,284.
Non-final Office Action dated Sep. 27, 2018 in U.S. Appl. No. 15/237,141.
"U.S. Appl. No. 14/284,817, filed May 22, 2014 and entitled Systems and Methods for Dynamic Proximity Based E-Commercetransactions".
"U.S. Appl. No. 14/318,091, filed Jun. 27, 2014 and entitled System and Method for Contextual Services Experiencetransactions".
U.S. Appl. No. 15/237,141, filed Aug. 15, 2016 and entitled Systems and Methods for Contextual Services Using Voice Personal Assistants.
U.S. Appl. No. 15/338,654, filed Oct. 31, 2016 and entitled Contextual Identification and Information Security.
U.S. Appl. No. 15/442,945, filed Feb. 27, 2017 and entitled Contextual Injection.
"U.S. Appl. No. 14/995,052, filed Jan. 13, 2016 and entitled System and Method for Creating and Administering Electronic-credentialscredentials".
Non-Final Office Action dated Mar. 9, 2016 in U.S. Appl. No. 14/995,052.
Advisory Action dated Mar. 27, 2018 in U.S. Appl. No. 14/515,813.
Non-final Office Action dated May 23, 2018 in U.S. Appl. No. 14/339,284.
Advisory Action dated Jun. 12, 2018 in U.S. Appl. No. 14/454,452.
Final Office Action dated Jun. 14, 2018 in U.S. Appl. No. 14/318,091.
Anonymous, Swirl Delivers First End-to-End In-Store Mobily Marketing Platform for Major Retailers, 2013, Oct. 17, PR Newsire. (Year: 2013).
Advisory Action dated Jun. 12, 2017 in U.S. Appl. No. 14/339,284.
Advisory Action dated Jul. 13, 2017 in U.S. Appl. No. 14/454,452.
Office Action dated Jul. 14, 2017 in U.S. Appl. No. 14/339,284.
Final Office Action dated Apr. 12, 2019 in U.S. Appl. No. 15/237,141.
Final Office Action dated May 17, 2019 in U.S. Appl. No. 15/154,106.
Advisory Action dated Nov. 19, 2018 in U.S. Appl. No. 14/995,052.
Notice of Allowance dated Dec. 26, 2018 in U.S. Appl. No. 14/339,284.
Non-Final Office Action dated Jan. 14, 2019 in U.S. Appl. No. 15/154,106.
Non-Final Office Action dated Jan. 28, 2019 in U.S. Appl. No. 14/454,452.

\* cited by examiner

SYSTEM AND METHOD FOR CONNECTIVITY CONTEXTUAL SERVICES LOCAL ONLINE EXPERIENCE

CROSS-REFERENCE TO RELATED APPLICATIONS

This application is a Continuation-In-Part of, claims priority to and the benefit of, U.S. patent application Ser. No. 14/318,091 filed Jun. 27, 2014, and entitled "System and Method for Contextual Services Experience". The aforementioned application is incorporated by reference in its entirety for all purposes.

FIELD

The present disclosure relates to systems and methods for delivering connectivity contextual services experiences, and more specifically, to delivering connectivity contextual services experiences based at least in part on a context environment.

BACKGROUND

Local merchants typically interact with customers through face-to-face dialogue in-store, or through a website. However, many local merchants lack the resources and infrastructure to develop a robust website. Moreover, many merchants of all sizes lack the capability to engage directly with users who search for them, at the time of the search, but often wait to interact with the user, until after the user enters the merchant's store, sends an email, or the like.

Moreover, typical customer promotions are delivered independently of customer transactions by mass mailing, or by electronic advertising. Local merchants typically lack the data necessary to create individually targeted advertising and deliver it to the consumer. Typical customer promotions are generic (e.g., coupons), and the customer promotions also typically require a customer to locate the promotion, remember its terms, and manually request it to be applied to a transaction at the point-of-sale.

SUMMARY

A system, method, and computer readable medium (collectively, "system") are disclosed. For instance, a connectivity contextual services ecosystem management system is disclosed. A connectivity contextual services ecosystem management system may include a connectivity contextual services connectivity system. A connectivity contextual services connectivity system may include a merchant targeting data database including connectivity directives indicating which of a plurality of connectivity contextual services to provide in response to a context environment including connectivity context characteristics. The connectivity contextual services connectivity system may further include a connectivity services repository having a database of connectivity contextual services, and a connectivity contextual services ecosystem manager configured to identify the context environment in response to the connectivity context characteristics and to provide connectivity contextual services from the connectivity services repository in response to the connectivity directives. The connectivity services repository may communicate with the connectivity contextual services ecosystem manager, and the connectivity contextual services ecosystem manager may provide a user with a connectivity contextual services experience in response to the context environment.

The connectivity contextual services ecosystem management system may also include a network configured to communicate with a user device. The connectivity contextual services ecosystem management system may include a network configured to communicate with a merchant device. Moreover, the connectivity contextual services may include at least one of conversation services, transactional services, display services or authentication services. Furthermore, the connectivity contextual services may be delivered via a social media channel.

In various embodiments, conversation services may include at least one of two-way real-time chat between a user device and a merchant device, delivery of stored messages from the merchant device to the user device, or delivery of user instructions from the user device to the merchant device.

In various embodiments, authentication services may include mechanisms of confirming a user identity including at least one of biometric authentication such as fingerprinting, a payment card swipe, a pin number, an identification photograph or a user location.

The connectivity context characteristics may include information provided by third parties such as at least one of merchants, social media, credit reporting agencies, or payment processors. The connectivity context characteristics may also include information such as user location data including at least one of present user device location, past user device location, or changes in the user device location.

The context environment may include triggers, such as a user location and a user dormancy status.

A method for consummating a communication between a user and a merchant is also disclosed. The method may include recognizing (by a computer-based system for consummating a communication between a user and a merchant) a merchant device connected to a connectivity contextual services connectivity system. The method further includes identifying, by the computer-based system, an identity of the merchant associated with the merchant device in response to the recognizing, and receiving, by the computer-based system, a query from a user device. The method may further include determining, by the computer-based system, that the merchant associated with the merchant device is a corresponding merchant to the query, prioritizing, by the computer-based system, the merchant in a response to the query, and returning, by the computer-based system, the response to the user device. Still further, the method may also include identifying, by the computer-based system, a user identity in response to the user confirming the user identity via the user device determining, by the computer-based system, connectivity contextual services to deliver to the user device and the merchant device in response to the authenticating, instantiating, by the computer-based system, a user-merchant session and delivering connectivity contextual services to the user device and the merchant device, and changing, by the computer-based system, the connectivity contextual services delivered to the user device and the merchant device in response to the user device moving from a first location to a second location. In various embodiments, identifying the user identity may include determining a location of the user.

Moreover, the method may involve connectivity contextual services that include conversation services. The conversation services may be delivered via a social media channel.

In various embodiments, the first location may be outside a premises of the merchant and the second location inside the premises of the merchant. The second location may be outside a premises of the merchant and the first location may be inside the premises of the merchant.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

The detailed description of exemplary embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

A connectivity contextual services ecosystem management system may enable merchants and users to engage and interact through electronic devices. For instance, a user may identify relevant nearby businesses via a smartphone app and may interact with one or more of the businesses, such as reviewing available inventories, asking questions, purchasing goods or services, requesting goods be placed on hold for the user to pick up, receiving offers, sending offers, receiving upsell opportunities, sending upsell opportunities, receiving promotions, sending promotions, and comparison shopping. In other words, a small merchant may be enabled to provide to users an experience similar to that available in-store and also similar to that available from a large online retailer, and a user may interact dynamically with one or more small retailers not only in-store, but also out-of-store via a user device, such as a smartphone.

Figure 1A:
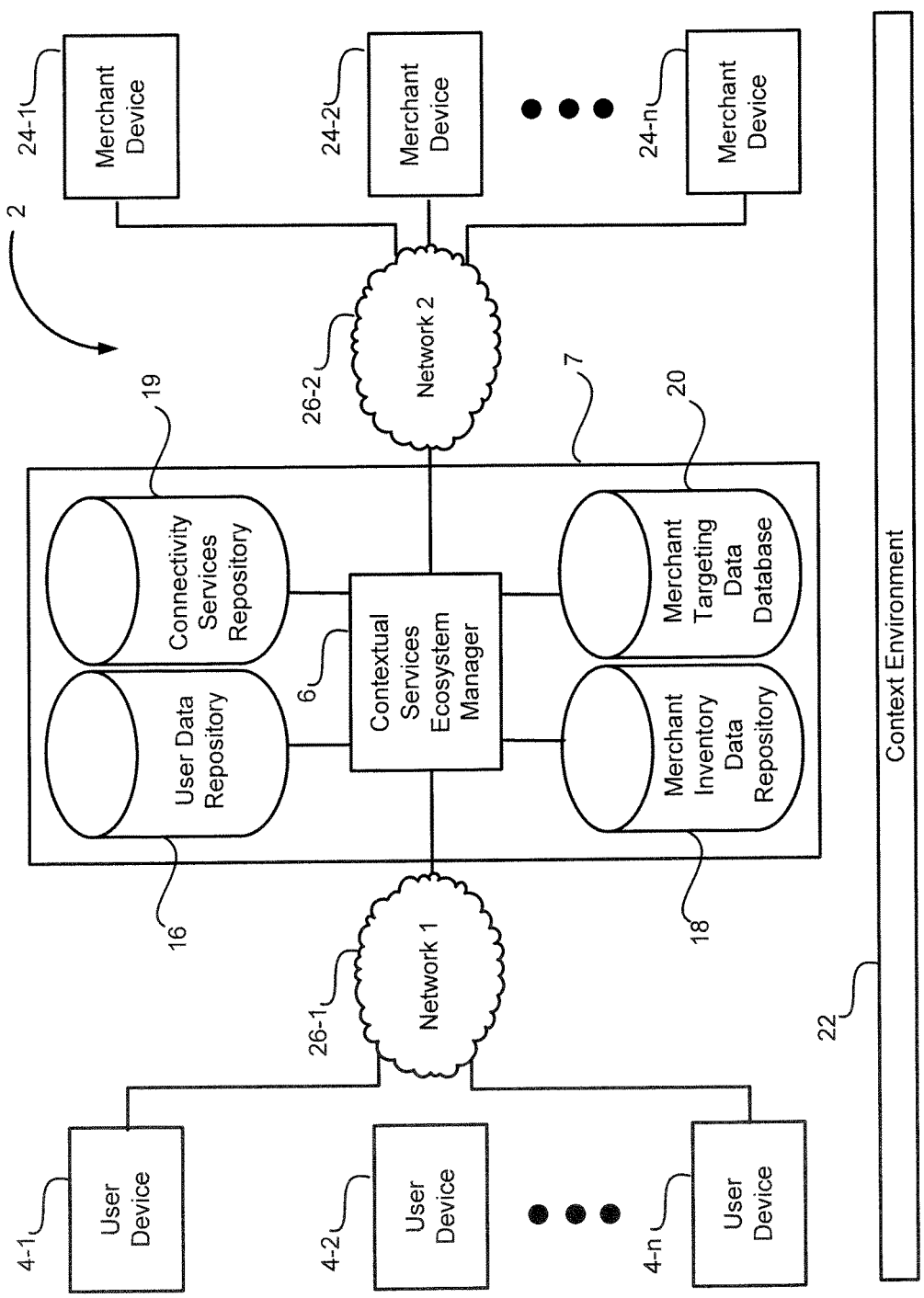
FIG. 1A is a block diagram illustrating various system components of a connectivity contextual services ecosystem management system, in accordance with various embodiments.

With reference to FIG. 1A, a connectivity contextual services ecosystem management system 2 may operate within a context environment 22. A context environment 22 may comprise any characteristic of one or more user, merchant, surrounding geography, surrounding business environment, item or any other factor or characteristic related to an interaction or potential interaction between a user and a merchant. Various aspects of the connectivity contextual services ecosystem management system 2 may acquire awareness of the context environment 22 through a variety of inputs. For instance, the system may acquire data from internal databases, external databases, credit card processors, merchant databases, a user's mobile device, point of sale machines, SKU data, store mapping data, cardmember data from internal databases, social media, and other sources. A context environment 22 may include the location of one or more user devices 4, such as a first user device 4-1, a second user device 4-2, and any number "n" of user devices 4, such as a $N^{th}$ user device 4-n. A context environment 22 may include whether a user is located at a POS terminal, whether a user is traveling toward or away from a store, whether a user is inside or outside a store, whether a user has just entered a store, and/or a user's general or specific location, direction of travel, and behavior. The context environment 22 may include a user payment status (e.g., whether a user has swiped a payment card, or authorized a payment on a user device 4), may include whether a user has opened an application on a user device 4, may include whether a user has scanned a product SKU, and/or any other information regarding the actions of a user. The context environment 22 comprises any characteristic related to the user, and/or historical information, and may include a past transaction by the user, and/or a potential future transaction by the user. Some or all of the context environment 22 data may be stored in the user data repository 16.

Thus, a context environment 22 may include any detail, fact, historical information, item information and/or predicted future behavior of a user. A context environment 22 may include information related to one or more user devices 4, such as transactions entered, searches performed, geodata, BLE ("Bluetooth Low Energy") activities, travel direction, travel speed, frequently visited locations, and any other information related to one or more user device 4.

A context environment 22 may comprise any characteristic of one or more merchant including the location of one or more merchant having a merchant device 24. For example, a first merchant device 24-1, a second merchant device 24-2, and any number "n" of merchant devices 24, such as a $N^{th}$ merchant device 24 may be associated with any number of merchants. A context environment 22 may include inventory data, which may be stored in merchant inventory data repository 18, and may include data on what types of users a merchant seeks to engage with, the types of engagement sought for different users or types of users, individual users the merchant seeks to engage with, or any other merchant targeting data which may be stored in a merchant targeting data repository 20.

Figure 1B:
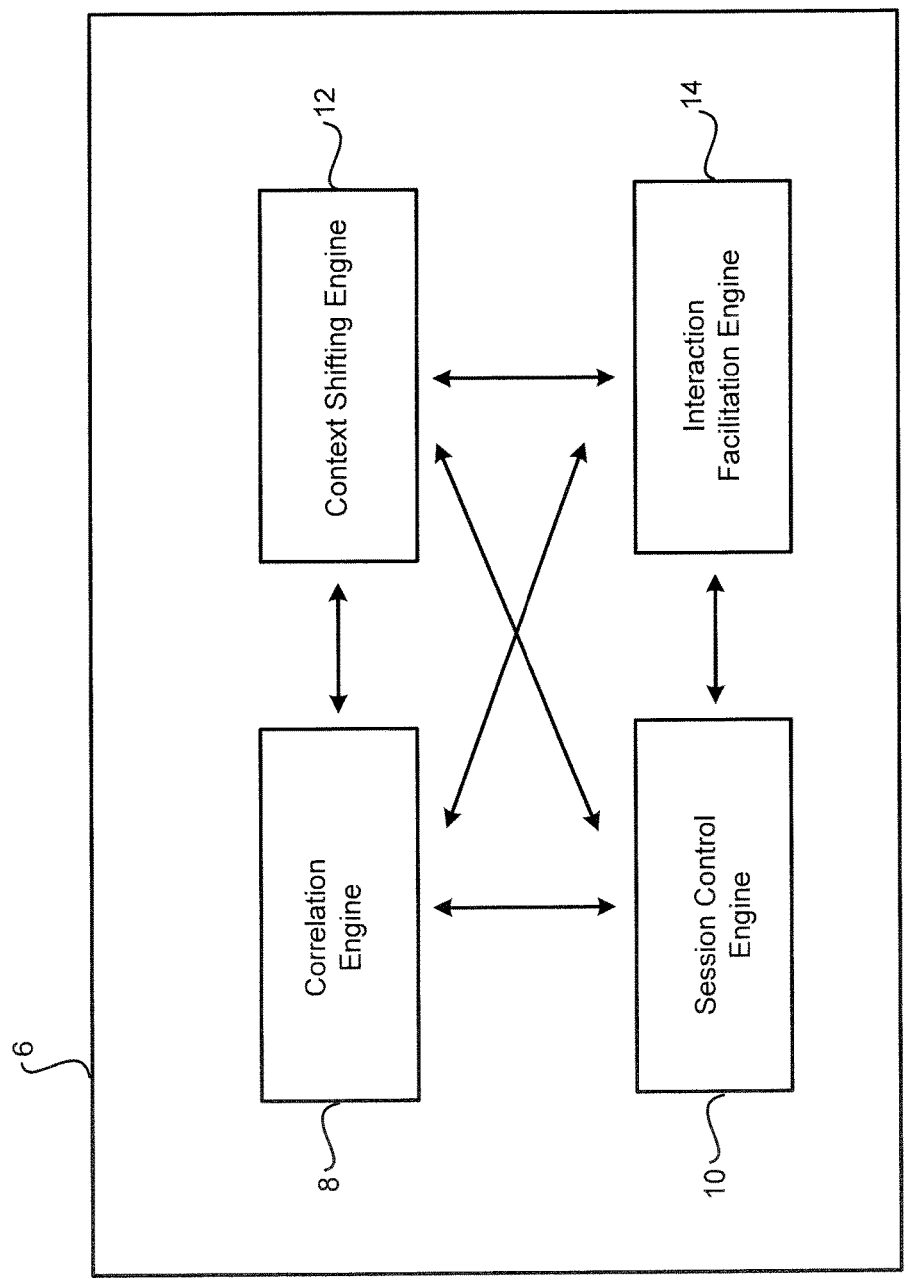
FIG. 1B is a block diagram illustrating various system components of a connectivity contextual services ecosystem manager module, in accordance with various embodiments.

In various embodiments, and with reference to FIGS. 1A and 1B, a connectivity contextual services ecosystem management system 2 may comprise a merchant device 24, a user device 4, a network 26, and a connectivity contextual services connectivity system 7. The connectivity contextual services connectivity system 7 may comprise a user data repository 16, a merchant inventory data repository 18, a connectivity services repository 19, a merchant targeting data repository 20, and a connectivity contextual services ecosystem manager module 6.

User device 4 may be in communication with and/or operatively coupled to (e.g., in "logical communication" with) connectivity contextual services connectivity system 7 via first network 26-1. Similarly, merchant device 24 may be in communication with and/or operatively coupled to connectivity contextual services connectivity system 7 via second network 26-2. In various embodiments, first network 26-1 and second network 26-2 are portions of the same larger network, although in other embodiments, first network 26-1 and second network 26-2 are discrete networks. For example, if connectivity contextual services connectivity system 7 is located at the boundary of a proprietary intranet, the first network 26-1 may comprise the internet, and the second network 26-2 may comprise a proprietary intranet.

Network 26 may be any suitable communication network, such as the Internet, and may comprise one or more payment network including, for example, the Internet, the American Express® Network, the Visa® network, the MasterCard® network, the Discover® card network, and/or the like. In this regard, network 26 may be configured to receive communications from merchant device 24 and/or user device 4, and/or an entity capable of gathering data from merchant device 24 and/or user device 4. Moreover, network 26 may be configured to facilitate the communications from merchant device 24 and/or user device 4 to the connectivity contextual services connectivity system 7 in substantially real time. In this regard, network 26 may be capable of and/or configured to facilitate an authorization of a transaction initiated at merchant device 24 and/or user device 4. In various embodiments, network 26 may include at least a portion of merchant device 24 and/or user device 4 and/or connectivity contextual services connectivity system 7, or at least a portion of the functions of merchant device 24 and/or user device 4 and/or connectivity contextual services connectivity system 7.

Phrases similar to a "connectivity contextual services connectivity system" (e.g., "connectivity contextual services connectivity system 7," or "CSCS") may include a company (e.g., a third party) appointed (e.g., by a merchant) to handle transactions (a "payment processor"). A payment processor may include an issuer, acquirer, authorizer, network 26 and/or any other system or entity involved in the transaction process, and/or at least a portion of the functions of such entities. Payment processors may be broken down into two types: front-end and back-end. Front-end payment processors have connections to various transaction accounts and supply authorization and settlement services to the merchant banks' merchants. Back-end payment processors accept settlements from front-end payment processors and, via The Federal Reserve Bank, move money from an issuing bank to the merchant bank. In an operation that will usually take a few seconds, the payment processor will both check the details received by forwarding the details to the respective account's issuing bank or card association for verification, and may carry out a series of anti-fraud measures against the transaction. Additional parameters, including the account's country of issue and its previous payment history, may be used to gauge the probability of the transaction being approved. In response to the payment processor receiving confirmation that the transaction account details have been verified, the information may be relayed back to the merchant, who will then complete the payment transaction. In response to the verification being denied, the payment processor relays the information to the merchant, who may then decline the transaction.

Phrases similar to a "payment gateway" or "gateway" may include an application service provider service that authorizes payments for e-businesses, online retailers, and/or traditional brick and mortar merchants. The gateway may be the equivalent of a physical point of sale terminal located in most retail outlets. A payment gateway may protect transaction account details by encrypting sensitive information, such as transaction account numbers, to ensure that information passes securely between the customer and the merchant and also between merchant and payment processor.

In various embodiments, a user may be capable of interacting with user device 4, network 26, and/or a merchant device 24. For example, a user may interact with merchant device 24 and/or user device 4 (e.g., a merchant, a website, an app, a virtual point of sale, a physical point of sale, an iPad® having an installed app, and/or the like) to initiate a transaction. Similarly, a user may interact with user device 4, network 26, and/or a merchant device 24 to initiate a transaction. Moreover, a user may interact with a user device 4, network 26, and/or a merchant device 24 to chat with a merchant, to search for a merchant, to search for a product, to receive offers, promotions, or upsell opportunities, to settle a transaction, fund a transaction, or otherwise communicate with the connectivity contextual services connectivity system 7, or otherwise communicate with a merchant via a merchant device 24, and/or the like.

In various embodiments, a user may interact with a connectivity contextual services connectivity system 7 by registering with a payment processor, or network 26, or the connectivity contextual services ecosystem manager module 6. Registration may in various embodiments satisfy regulatory "opt-in" requirements. In further embodiments, registration may allow the system to tailor the user experience, whether in real time during user interactions, or in the background before or after user interactions. In operation, payment processor or network 26 or the connectivity contextual services ecosystem manager module 6 may be capable and/or configured to facilitate authorization and/or settlement of transactions by analyzing information from user device 4 and/or merchant device 24, as well as other information available at the connectivity contextual services ecosystem manager module 6. However, networks may not be capable of and/or configured to monitor, track, record, and/or count the number of transactions associated with a particular user. Moreover, the transaction information communicated between a point of sale and payment processor may not be sufficient to particularly identify a user by a network.

In various embodiments, connectivity contextual services connectivity system 7, connectivity contextual services ecosystem manager module 6 and/or network 26 may be capable of providing a connectivity contextual services local online connectivity experience. In this manner, the connectivity contextual services connectivity system 7 provides a connectivity contextual services local online connectivity experience to users. For simplicity, the disclosure will discuss operations by connectivity contextual services connectivity system 7, but one skilled in the art will appreciate that network 26 may perform one or more of the functions.

In various embodiments and with continuing reference to FIG. 1A, a merchant device 24 may comprise a computer, a tablet, for example, an iPad®, a terminal, or any other device or system whereby a transaction may be initiated, or communications may be initiated. For example, a merchant device 24 may comprise any device, interface, or merchant, a website, an app, a virtual point of sale, or a physical point of sale. A merchant device 24 may have various different input and output capabilities. For example, a merchant device 24 may comprise a plain-text display, may comprise a graphical display, or may comprise a rich audio-visual user interaction mechanism.

A merchant device 24 may comprise a portable device whereby a merchant may interact with the connectivity contextual services connectivity system 7. For example, a merchant device 24 may comprise a phone, a tablet, for example, an iPad®, a laptop, or any other suitable electronic device. In various embodiments, a merchant device 24 comprises an iPhone®, a Blackberry®, a device running an Android® operating system, a Nokia® phone, a Windows® phone, or any other data access and/or telephony device.

A user device 4 may comprise a computer, a tablet, for example, an iPad®, a terminal, or any other device or system whereby a transaction may be initiated, or communications may be initiated. For example, a user device 4 may comprise any device, interface, or merchant, a website, an app, a virtual point of sale, or a physical point of sale. A user device 4 may have various different input and output capabilities. For example, a user device 4 may comprise a plain-text display, may comprise a graphical display, or may comprise a rich audio-visual user interaction mechanism.

A user device 4 may comprise a portable device whereby a user may interact with the connectivity contextual services connectivity system 7. For example, a user device 4 may comprise a phone, a tablet, for example, an iPad®, a laptop, or any other suitable electronic device. In various embodiments, a user device 4 comprises an iPhone®, a Blackberry®, a device running an Android® operating system, a Nokia® phone, a Windows® phone, or any other data access and/or telephony device.

Finally, as mentioned previously, a connectivity contextual services ecosystem management system 2 may comprise a connectivity contextual services connectivity system 7 configured to establish connectivity between a user device 4 and a merchant device 24, between different user devices 4, between different merchant devices 24, and between groups of user devices 4 and merchant devices 24, as well as deliver a connectivity contextual services local online connectivity experience to a user and/or merchant via a user device 4 and/or a merchant device 24. Also, as previously mentioned, the connectivity contextual services connectivity system 7 may comprise a user data repository 16, a merchant inventory data repository 18, a connectivity services repository 19, a merchant targeting data repository 20, and a connectivity contextual services ecosystem manager module 6. A connectivity contextual services ecosystem manager module 6 may identify a context environment 22 and may deliver a connectivity contextual services local online connectivity experience comprising connectivity contextual services from connectivity services repository 19 to a user device 4 and/or a merchant device 24, in response to a context environment 22, and/or in response to past context environments 22, and in accordance with various methods.

A connectivity services repository 19 may communicate with the connectivity contextual services ecosystem manager module 6. The connectivity services repository 19 may comprise a database containing connectivity contextual services comprising instructions which, when executed by the connectivity contextual services ecosystem manager module 6, cause the connectivity contextual services ecosystem manager module 6 to deliver various different connectivity contextual services experiences to a user device 4 and/or a merchant device 24. A connectivity contextual services experience may comprise any combination of connectivity contextual services. A connectivity services repository 19 may comprise connectivity contextual services comprising conversation services, transaction services, display services, and authentication services. In this manner, a user's interactions with a user device 4 and/or a merchant device 24 may be customized and a user may be able to access the merchant, the merchant's personnel, the merchant's inventory, and the like, without having to enter the merchant's store. For example, various connectivity contextual services may be delivered from a connectivity services repository 19 and to a user device 4 and/or a merchant device 24, such as via a restful API, or an app, or via various mechanisms.

A merchant targeting data repository 20 may comprise a public or private database of information provided by a merchant. For example, a merchant may wish to provide various types of users with various connectivity contextual services local online connectivity experiences. The merchant targeting data repository 20 may comprise instructions ("connectivity directives") indicating which users (which may be associated with user device(s) 4) have desired characteristics ("targeting factors"), in response to different context environments 22. The targeting factors may derive from various data, such as inventory, spreadsheet data, iBeacon data, SKU data, timed offers, SKU based offers, personally identifying information, and the like. The merchant targeting data repository 20 may be in electronic and/or logical communication with the connectivity contextual services ecosystem manager module 6. Thus, the merchant targeting data repository 20 may be said to contain records of linkages between different connectivity context characteristics (of the context environment 22) and different targeting factors and may be accessed by the connectivity contextual services ecosystem manager module 6, for example, in order to determine which connectivity contextual services local online connectivity experience to provide in response to different context environments 22 and/or data in the user data repository 16.

Moreover, the connectivity contextual services local online connectivity experience may be delivered in real time or substantially real time. For instance, the connectivity contextual services local online connectivity experience may be delivered in response to a present context environment 22. Furthermore, the directive may comprise dynamic instructions to deliver a connectivity contextual services local online connectivity experience in response to a present context environment 22 with consideration for past context environments 22, past connectivity contextual services delivered, and/or past consumer responses, for example, whether a consumer entered a transaction, accepted/rejected an offer, searched for a merchant, communicated with a merchant, entered the store of a merchant, and the like. Thus, the merchant targeting data repository 20 may comprise connectivity directives comprising machine learning instructions. Similarly, the context environment 22 may be said to be path-dependent, for example, it may account for previous context environments 22 and/or consumer behaviors.

A user data repository 16 may comprise a public or private repository of information provided by various sources about one or more user of one or more user device 4. A user data repository 16 may comprise stored connectivity context characteristics. For example, a user data repository 16 may comprise information provided by third parties such as merchants, social media, credit reporting agencies, payment processors, and internal data (e.g., risk analysis, analytics, name of stores visited by different users, and transaction history). The user data repository 16 may comprise connectivity context characteristics, such as transactions, and data regarding transactions (e.g., location, date, and time of transaction), present location, past location, proximity sensing data, such as iBeacon® data, amount spent, merchant, frequency of transactions, number of transactions, transaction categorizations, searches, interests, interactions with merchants, travel patterns, search patterns, and the like.

For example, connectivity context characteristics may comprise an activity in a social media channel (e.g., a Tweet). Examples of social media channels include Facebook®, Foursquare®, Twitter®, MySpace®, LinkedIn®, and the like. In response to activity in the social media channel, various connectivity context characteristics may be stored, for example, an individual's comments in a social media channel toward a particular retailer. For example, an individual who comments about retailers in a particular market segment may be of interest to other retailers in that same market segment, and thus this activity may be of interest to store as connectivity context characteristics. Similarly, connectivity context characteristics may comprise an activity in an entertainment channel (e.g., xBox®) or a review channel (e.g., TripAdvisor®), or activity in a reservation channel (e.g., OpenTable®), or may comprise any activity or combination of activities.

Moreover, connectivity context services, such as conversation services may be delivered via a social media channel. For example, a user may be identified via social medial behavior, a user may be observed via a social media channel, a user interaction with a merchant may transpire via a social media channel. For instance, a user may be invited to "check in" at a location on a social media platform to receive a discount. The user may receive a message or pop-up display when in the area of a merchant. Users may be requested by a merchant to take a virtual act in a social media channel, such as click a "like" button, or the user may be requested by a merchant to take a real-world act such as enter a store, via a social media channel.

Some or all of the information comprising a context environment 22 may be stored in the user data repository 16 for access by the connectivity contextual services ecosystem manager module 6. It may also be said that some or all of the information comprising a context environment 22 may be provided by a user device 4 and/or a merchant device 24 and stored in the user data repository 16. The user data repository 16 may communicate with the connectivity contextual services ecosystem manager module 6. Thus, the connectivity contextual services ecosystem manager module 6 may access the user data repository 16 to identify different connectivity context characteristics in order to provide various types of users with various connectivity contextual services (and thus various connectivity contextual services local online connectivity experiences).

A connectivity contextual services ecosystem management system 2 may operate within a context environment 22. A context environment 22 comprises various potential triggers (e.g., user location, proximity sensing data, such as iBeacon® data, payment status, transaction, past user behavior, past context environments 22, past connectivity contextual services delivered to a user, past connectivity contextual services ecosystem management system 2 operations of any sort, past user behavior following the delivery of past connectivity contextual services, past user behavior following the delivery of past connectivity contextual services in view of past context environments 22, and the like) that, upon detection, trigger the connectivity contextual services ecosystem management system 2 to execute various methods.

Thus, the connectivity contextual services connectivity system 7 may manage the logical connectivity between a user device 4 and a merchant device 24 in response to processing by a connectivity contextual services ecosystem manager module 6. This managing may include delivering connectivity contextual services from a connectivity services repository 19, to a user device 4 and/or a merchant device 24, in response to processing by a connectivity contextual services ecosystem manager module 6, wherein connectivity context characteristics from a connectivity services repository 19 are assessed in comparison to a merchant targeting data repository 20. In response to a context environment 22 triggering the connectivity contextual services connectivity system 7 to deliver connectivity contextual services, the connectivity contextual services connectivity system 7 may determine a correspondence between data from the connectivity services repository 19 with an instruction from a merchant targeting data repository 20 corresponding to this data and directing the provision of various services. Thus, the connectivity contextual services ecosystem manager module 6 may provide various services to the user device 4 and/or the merchant device 24.

In further embodiments, the connectivity contextual services connectivity system 7 may deliver connectivity contextual services based on a determined correspondence which incorporates and/or is responsive to machine learning connectivity directives as previously discussed. For example, the correspondence may account for past context environments 22, past connectivity contextual services from a connectivity services repository 19 delivered by the connectivity contextual services connectivity system 7, external data, such as past consumer purchases or past consumer social media posts, and/or past consumer interactions with the connectivity contextual services ecosystem management system 2, and the like.

Similarly, this managing may include delivering merchant inventory data from a merchant inventory data repository 18 to a user device 4 in response to a processing by a connectivity contextual services ecosystem manager module 6, wherein data representative of the inventory of a merchant associated with a merchant device 24 in logical connection with a user device 4 may be retrieved by the connectivity contextual services ecosystem manager module 6 and delivered to the user device 4. In response to a context environment 22 triggering the connectivity contextual services connectivity system 7 to deliver connectivity contextual services comprising inventory data, the connectivity contextual services connectivity system 7 may determine a correspondence between data from the merchant inventory data repository 18 with an merchant in connectivity with a user device 4, or from a merchant not in connectivity with a user device 4, for example, in response to a user query requesting that a nearby merchant with certain items in inventory be identified.

Thus, one may appreciate that the connectivity contextual services connectivity system 7 and/or any other component of the connectivity contextual services ecosystem management system 2 may implement machine learning techniques, for example, supervised learning techniques, and/or unsupervised learning techniques. In this manner, the connectivity contextual services ecosystem management system 2 may dynamically respond to context environments 22 and may respond differently to different consumers, or differently to a given consumer in a given context environment 22 in view of that consumer's changing behavior and/or past behavior, purchases, social media posts, etc. Thus the connectivity contextual services connectivity system 7 may deliver connectivity contextual services from a connectivity services repository 19 to user device 4 and/or a merchant device 24, in response to processing by a connectivity contextual services ecosystem manager module 6, wherein the processing includes machine learning algorithms and also accounts for past consumer behavior and connectivity contextual services ecosystem management system 2 behavior. As such, the connectivity contextual services delivered may be tailored to each context environment 22, accounting for historical data and performance. The connectivity contextual services connectivity system 7 may determine a correspondence between data from the user data repository 16 with an instruction from a merchant targeting data repository 20 corresponding to this data and directing the provision of various services. As such, a feedback loop may be established among consumer behavior, the response of the connectivity contextual services ecosystem manager module 6 in selecting connectivity contextual services from a connectivity services repository 19 for delivery in response to a present context environment 22 and the data stored in the user data repository 16, merchant inventory data repository 18, and/or other sources of data, including historical data.

For example, a consumer who has previously traveled from a frequently visited location (e.g., home) toward a merchant's store may be provided with inventory data from that specific store whenever he or she enters a query on a user device 4 seeking a specific item that is in stock at that, and other stores. Thus, the user may be provided with connectivity contextual services tailored to that user.

Furthermore, as discussed further herein, a connectivity services repository 19 may comprise connectivity contextual services including conversation services. For example, conversation services may be instantiated between the user and the merchant. The conversation services may comprise permitting the user to converse with the merchant (e.g., a text chat between the merchant and user), receive offers from the merchant tailored to the user, put items on hold for pickup, and the like.

Moreover, when the consumer enters the store, this change in the context environment 22 may be detected by the connectivity contextual services ecosystem manager module 6 and additional connectivity contextual services may become available. Exemplary processes and systems disclosed in U.S. patent application Ser. No. 14/318,091, SYSTEM AND METHOD FOR CONNECTIVITY CONTEXTUAL SERVICES EXPERIENCE are incorporated by reference.

The connectivity contextual services connectivity system 7 may consider, for example, available products, social media activity, such as Facebook® activity and/or Twitter® activity, activity of other users, activity of other merchants, activity of the instant user, activity of an instant merchant, American Express® internal data, SKU data, sentimental analysis of data such as social media activity to determine individual or collective sentiments regarding products and/or merchants, etc., and may determine connectivity contextual services to delivery to a user. Moreover, different connectivity contextual services may be ranked for a user in view of user behavior, American Express® internal data, and merchant targeting data repository 20 data, and may be delivered based on different context environments 22 according to machine learning processes as discussed.

With renewed focus on connectivity services repository 19, connectivity services repository 19 may comprise connectivity contextual services comprising transactional services, conversation services, display services, and authentication services. In this manner, a user's interactions with a user device 4 and/or a merchant device 24 may be customized. Moreover, these interactions may be customized in real time or substantially real time, e.g., they may be customized as (or close to when) they occur.

Connectivity contextual services may comprise conversation services as discussed. In further embodiments, conversation services may include two-way real-time communication, such as real-time chat between a user and a merchant or merchant's employee, two-way non-real-time communication, such as the delivery of stored messages or pre-programmed messages, and one-way communication, both real-time and non-real-time, such as automated messages, advertisements, user instructions to the merchant, and merchant instructions to the user. Conversation services may be instantiated between users ("user-to-user"), between merchants ("merchant-to-merchant") or between groups involving one or more user and/or one or more merchant. The conversation services may comprise permitting the user to converse with the merchant, receive offers from the merchant tailored to the user, put items on hold for pickup, and the like.

Connectivity contextual services may comprise transactional services. Transactional services may include the delivery of information regarding available inventory, the sale of an item, an offer to sell an item, an offer to sell a related and/or complementary good or service, an offer to sell a competing good or service, an proposed discount, the identification of a user's location and the delivery of other transactional services in response thereto (e.g., the identification of a user's location by triangulation and/or iBeacon® systems, and or proximity sensing data), Bluetooth low energy communication systems, GPS systems, near-field communication systems, the invitation to purchase a warranty, and/or tracking of SKUs purchased or considered for purchase.

In various embodiments, different connectivity contextual services may be available depending on the technical capabilities of a user device 4 and/or a merchant device 24. For example, a user whose user device 4 permits video chatting may receive audio-visual conversation services, whereas a user whose user device 4 permits only text chatting may receive text conversation services.

Different connectivity contextual services may be available depending on the location of a user device 4 and/or a merchant device 24. For instance, a user whose location is identified as being at a merchant device 24 may receive real-time updates targeted to the individual and/or in view of a context environment 22. For example, a user whose location is identified as being at a merchant device 24 may receive real-time updates (of purchased products, complementary products, upsell products, product information, etc.) displayed on the user device 4 as a store clerk scans the items being purchased, whereas a user whose location is identified as being at a remote location may receive connectivity contextual services comprising requesting items be shipped to that user's location.

Further, different connectivity contextual services may be available depending a change in location of a user device 4 and/or a merchant device 24. For example, a user identified as traveling toward a store, or located within a certain distance (for example, an hour's journey) of the store may be enabled to place the item on hold for pickup, whereas a user identified as being located outside a certain distance (for example, a day's journey) of the store, may be prevented from placing items on hold, but may be permitted to access conversation services instead, speaking directly with the merchant and inquiring about long-term availability of the item.

Similarly, the connectivity contextual services may comprise display services. Display services may include a textual information presentation, a graphical information presentation, an invitation to determine an item for purchase via a user device 4 and/or a merchant device 24, an invitation to complete a transaction via a user device 4 and/or a merchant device 24, and/or an invitation to complete a transaction via a point-of sale terminal. In various embodiments, different connectivity contextual services may be available depending on the technical capabilities, location, and/or change in location of a user device 4 and/or a merchant device 24. For example, a merchant device 24 lacking a sound output may flash a light when a user device 4 is nearby, whereas a merchant device 24 having a sound output may play a chime when a user device 4 is nearby.

Furthermore, the connectivity contextual services may comprise authentication services. In various embodiments, authentication services comprise various mechanisms whereby an action is approved by a user and the identity of the user is confirmed. For example, authentication services may comprise biometric authentication (e.g., fingerprint information), payment card swipe, entry of a pin number, identification of a photograph, and/or identification of a user by that user's location. For example, a user may be authenticated by the user device 4 being located at a location, or traveling on a path known to be associated with a particular user. In various embodiments, a user may be authenticated by identification of a user by that user's location, wherein the location of the user device 4 is determined to be inside a merchant's store, and the available context services updated by the connectivity contextual services ecosystem manager module 6 according to various systems and processes such as those disclosed in U.S. patent application Ser. No. 14/318,091, SYSTEM AND METHOD FOR CONNECTIVITY CONTEXTUAL SERVICES EXPERIENCE, which is incorporated by reference.

Authentication services may further enable the connectivity contextual services ecosystem manager module 6 to identify which users (associated with data in the user data repository 16) are interacting with which user devices 4, and direct connections between merchants and users accordingly.

Moreover, the connectivity contextual services may comprise connectivity services. In various embodiments, connectivity services may include enabling a user to search for a provider of a desired product and begin interacting with a merchant device 24 located at that provider, enabling a user to search an identified provider for desired products and begin interacting with a merchant device 24 located at that provider, or any other connection between the user device 4 and the merchant device 24 so that the user and merchant may interact even before the user enters the merchant's store.

In various embodiments, connectivity contextual services connectivity system 7 may be able to particularly identify and/or associate one or more transactions with a particular user. Moreover, information provided by a user may be used by connectivity contextual services connectivity system 7 to particularly identify transactions routed between POS terminals, merchant devices 24, or user devices 4, and the connectivity contextual services connectivity system 7 by network 26.

The connectivity contextual services connectivity system 7 may be able to identify a customer upon his or her entry into a store. In this manner, the connectivity contextual services connectivity system 7 may open an in-store session with the user, such as according to various systems and processes such as those disclosed in U.S. patent application Ser. No. 14/318,091, SYSTEM AND METHOD FOR CONNECTIVITY CONTEXTUAL SERVICES EXPERIENCE, which is incorporated by reference.

Figure 2:
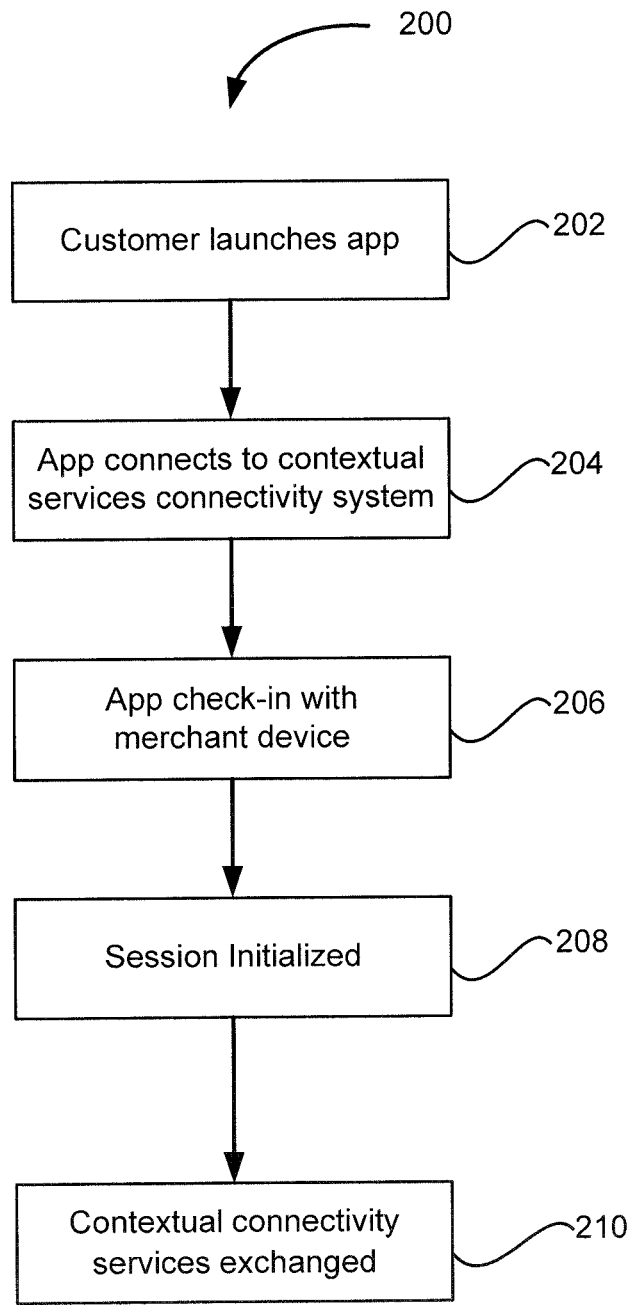
FIG. 2 illustrates a process flow for initializing a user session prior to delivering services, in accordance with various embodiments.

With reference to FIG. 2, the connectivity contextual services connectivity system 7 may be able to identify a customer based on activity outside a store. In this manner, the connectivity contextual services connectivity system 7 may open an out-of-store session with a user. A method of instantiating an out-of-store user session 200 may include a customer launching an application on a user device 4 (Step 202). The application on the user's user device 4 may logically connect to a connectivity contextual services connectivity system 7, such as by Bluetooth Low Energy ("BLE") communication, by cellular communication, by Wi-Fi communication, by Near-Field Communication ("NFC"), or by any IEEE 802 standard communications technology (Step 204). Subsequently, the connectivity contextual services connectivity system 7 may enable the application to communicate with one or more merchant device 24, identify itself and thus may be said to "check-in" with the merchant device 24 (Step 206). An out-of-store session is subsequently established between the merchant device 24 and the user device 4, wherein each is aware of the other's presence and information, such that connectivity contextual services may be exchanged (Step 208). Thereafter, connectivity contextual services are exchanged (Step 210). For instance, in various embodiments, a subset or all of a store's inventory data may optionally be displayed on the user device 4.

Such inventory data may be searchable, provide comparisons to other inventories, associate items, determine complementary items, analyze competing items, etc. The user may be further permitted to pay for items, ship items, may be directed to a store having the items and/or a location within the store where the items are located, and/or to direct that items be held for in-store pickup. Furthermore, any additional connectivity contextual services, as discussed herein may be delivered to the user. As a result, an online presence may be provided for a store that otherwise would lack a website or online purchasing and/or inventory searching mechanisms.

Moreover, in further embodiments, such data, as well as any functionality or features of the methods and systems disclosed herein may be delivered to a user via network 26 regardless of that user's location. For example, a user may be permitted access to inventory data via a user device 4, and/or a web browser, regardless of whether the user is physically in the store.

With reference to FIGS. 1A and 1B, various methods may be performed by various different components of the connectivity contextual services ecosystem manager module 6. For example, the connectivity contextual services ecosystem manager module 6 may comprise a correlation engine 8, a context shifting engine 12, a session control engine 10, and an interaction facilitation engine 14. The various engines may be in communication and may perform various steps of various methods as discussed further herein.

Figure 3:
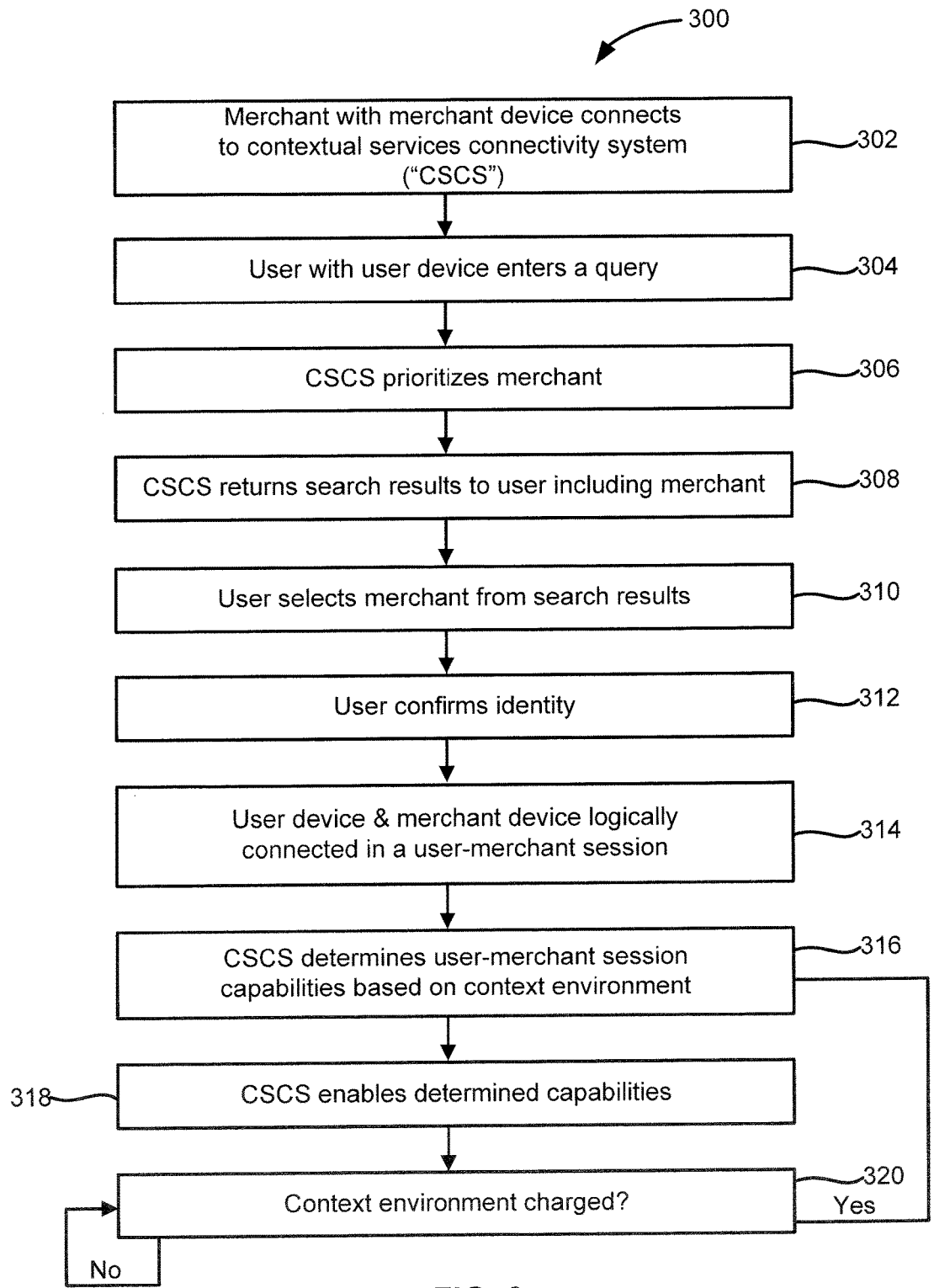
FIG. 3 illustrates a process flow for delivering connectivity contextual services to a user and a merchant, in accordance with various embodiments.

With reference to FIGS. 1A, 1B, and 3, connectivity contextual services connectivity system 7 may perform a method 300 consummating a communication between a user and a merchant. For example, a merchant having a merchant device 24 may connect its merchant device 24 to the connectivity contextual services connectivity system 7 (Step 302). The session control engine 10 of the connectivity contextual services connectivity system 7 may recognize the merchant device 24 and may determine the identity of the merchant associated with the merchant device 24 in response to the connecting. This identity may comprise a context characteristic of the context environment 22. Subsequently, a user having a user device 4 may enter a query (Step 304). This entering may comprise launching an app, and entering a query indicating that the user is seeking to engage in a possible transaction or interaction with a merchant, such as seeking a product, a product type, a merchant, a merchant type, or the like. The interaction facilitation engine 14 receives this query and may request that a correlation engine 8 determine one or more merchant device 24 associated with a merchant that may potentially be responsive to the user query (e.g., the merchant is "a corresponding merchant to the query"). The correlation engine 8 may prioritize one or more merchant having one or more merchant device 24 in response to the query (Step 306). In further embodiments, a third-party search provider may process a user query and may determine one or more merchant that may potentially be responsive to the user query and/or prioritize one or more merchant in response to the query. In further embodiments, the correlation engine 8 may interact with the third-party search provider in order to return the search results to the user. The correlation engine 8 may request that the interaction facilitation engine 14 return the search results to the user, including the identified merchants (Step 308). These search results may be displayed at a user device 4. The user may select a merchant from the search results that the user potentially desires to interact with, regarding the user's query (Step 310). The user device 4 may transmit this selection to the interaction facilitation engine 14 of the connectivity contextual services connectivity system 7. The user may further identify himself or herself via the user device 4 (e.g., the user may "confirm its identity"). For instance, the user may enter a password, or biometric information, or may be identified by the position, change in position, or travel of the user device 4 (Step 312). In this manner, the context environment 22 may include the identity of the user, so that the connectivity contextual services connectivity system 7 may deliver customized connectivity contextual services tailored to that individual. The interaction facilitation engine 14 may interoperate with the session control engine 10 to set up a logical connection between the user device 4 and the merchant device 24 comprising a user-merchant session (Step 314). The context shifting engine 12 may receive the identity of the user in interaction with a user data repository 16 and the context shifting engine 12 may determine which connectivity contextual services from the connectivity services repository 19 to deliver to the user device 4 and the merchant device 24 (Step 316). The context shifting engine 12 may change the connectivity contextual services depending on changes in the context environment 22, and may shift the user-merchant session between in-store and out-of-store sessions, as the user moves about. The context shifting engine 12 may instruct the interaction facilitation engine 14 to make connectivity contextual services available to the user and merchant via the user device 4 and merchant device 24, respectively (Step 318).

As the user and merchant interact, the context environment 22 may change, such as if the user moves location, or goes between out-of-store and in-store locations. Thus, the context shifting engine 12 may periodically evaluate whether the context environment 22 has changed in certain ways, such as the user moving location (Step 320). In the event that the user context does change in a relevant way, the process may return to Step 316, and the context shifting engine 12 may again determine which connectivity contextual services from the connectivity services repository 19 to deliver to the user device 4 and the merchant device 24. In the event that the user has transited from an out-of-store location, to an in-store location, various systems and processes may be implemented such as those disclosed in U.S. patent application Ser. No. 14/318,091, SYSTEM AND METHOD FOR CONNECTIVITY CONTEXTUAL SERVICES EXPERIENCE, which is incorporated by reference. In the event that the user has transited from an in-store location, to an out-of-store location, various systems and processes as discussed herein may be implemented. Thus, one may appreciate that the connectivity contextual services available to the user and the merchant may change based on the context environment 22 and as the user-merchant session morphs between an in-store session and an out-of-store session.

In this manner, a merchant, in conjunction with the connectivity contextual services connectivity system 7 may manage the customer experience both in store and out of store. The connectivity contextual services connectivity system 7 may enable a user to navigate a local search of merchants and/or merchandise, identify information about frequent customers, allow customers to order ahead, and the like. For example, a listing of merchants and/or merchandise may be stored in a database and in response to user navigation and/or searching, the connectivity contextual services connectivity system 7 may interact with a third party search provider to provide responsive data to a user and/or merchant. The merchants can see how many potential buyers have expressed interest or entered relevant queries and may open communications via conversation services with users who are in a relevant context environment 22, such as users nearby their store, or users who are in a competitor's store. The merchant may open chat dialogs, may offer promotions, upsell opportunities, may display inventory and the like to those users. A user may receive an offer promotion, upsell opportunity, navigate inventory, see reviews, put items on hold and the like.

Moreover, as the context environment 22 changes, users and/or merchants may choose to reengage or initially engage merchants and/or users whose devices are currently, or have previously connected to the connectivity contextual services connectivity system 7. For instance, a customer may begin an interaction with a merchant via conversation services, and then may stop interacting. The connectivity contextual services connectivity system 7 may record in the user data repository 16 that that user is dormant. Thus, one of the triggers comprising the context environment 22 may be a user dormancy status. A user dormancy status may comprise whether a user is active, inactive, is moving, is stationary, is interacting with the connectivity contextual services connectivity system 7, is not interacting with the connectivity contextual services connectivity system 7, the period between user interactions with the connectivity contextual services connectivity system 7 and/or the time elapsed since the last interaction with the connectivity contextual services connectivity system 7, and the like. In various embodiments, the connectivity contextual services connectivity system 7 may alert merchants whenever a dormant user resumes interacting with the system, or enters into proximity to the store (so that the merchant can provide an offer, or the like, to attempt to reengage the user), and the like. Thus, as one may appreciate, different connectivity contextual services may be provided to users who are near, far, traveling toward, traveling away from, or in the drive-thru window, of a merchant, or based on any other connectivity context characteristic.

The phrase "upsell opportunity" shall include any offer for an additional benefit, opportunity or purchase. For example, an "upsell opportunity" shall include an offer to purchase a higher priced good or service, a related good or service, a complementary good or service, a warranty, a service plan, services related to a purchase of a good, a good related to a purchase of a service, or any additional transaction or consideration, and the like.

Similarly, the phrase "promotion" shall include an offer for a price discount and/or an offer to provide additional and/or higher-quality items at the same price or at a lower price, or at a lower unit price and the like. Thus, it may be said that a promotion is an increase in the items provided to a customer for a given price, whereas an "upsell opportunity" may be said to be an increase in the amount of currency paid by the consumer. Accordingly, some upsell opportunities shall include promotions and some promotions shall include upsell opportunities.

As used herein, "match", "corresponds with" or "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

Any communication, transmission and/or channel discussed herein may include any system or method for delivering content (e.g. data, information, metadata, etc.), and/or the content itself. Moreover, the connectivity contextual services ecosystem management system 2 may provide a standardized API interface for POS devices and/or software, merchants and third-party systems and devices. In this manner, a seamless user experience is presented, e.g., connectivity contextual services may be delivered in a variety of context environments 22 and in systems and in systems of systems having different devices and technologies. The content may be presented in any form or medium, and in various embodiments, the content may be delivered electronically and/or capable of being presented electronically. For example, a channel may comprise a website or device (e.g., Facebook, YouTube®, AppleTV®, Pandora®, xBox®, Sony® Playstation®), a uniform resource locator ("URL"), a document (e.g., a Microsoft Word® document, a Microsoft Excel® document, an Adobe .pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include Facebook®, Foursquare®, Twitter®, MySpace®, LinkedIn®, and the like. Examples of affiliate or partner websites include American Express®, Groupon®, LivingSocial®, and the like. Moreover, examples of mobile device communications include texting, email, and mobile applications for smartphones. In various embodiments and as used herein, a digital channel may be any suitable channel available to a user over a network, including for example, a social media channel, an entertainment channel, a service channel, a review channel, a service scheduling channel, and/or the like. The channel may include a user interface and user account that may be created by a user. Moreover, the user may be able to access the digital channel through a web client on any suitable electronic device. The digital channel may also be considered a non-traditional purchasing channel (e.g., a channel where information about an item may be present, but where the ability to purchase the item is not traditionally available such as, for example, an item page in a social media channel where information about an item is available).

The phrases consumer, customer, user, account holder, account affiliate, card member or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. The card member may include a transaction account owner, a transaction account user, an account affiliate, a child account user, a subsidiary account user, a beneficiary of an account, a custodian of an account, and/or any other person or entity affiliated or associated with a transaction account. In various embodiments, no physical card is associated with the account, and moreover, the user may not be a card member or have an account, but rather may access the system via a Facebook® profile, or via a web browser, for example, in order to access functionality of the connectivity contextual services ecosystem management system 2 without being a card member.

Phrases and terms similar to "account", "account number", "account code" or "consumer account" as used herein, may include any device, code (e.g., one or more of an authorization/access code, personal identification number ("PIN"), Internet code, other identification code, and/or the like), number, letter, symbol, digital certificate, smart chip, digital signal, analog signal, biometric or other identifier/indicia suitably configured to allow the consumer to access, interact with or communicate with the system. The account number may optionally be located on or associated with a rewards account, charge account, credit account, debit account, prepaid account, telephone card, embossed card, smart card, magnetic stripe card, bar code card, transponder, radio frequency card or an associated account.

In various embodiments, a transaction account may be may include any account that may be used to facilitate a financial transaction including, for example, a charge account, a credit account, a bank account (e.g., a checking or savings account), and/or the like. The transaction account may include a transaction instrument such as a charge card, credit card, debit card, awards card, prepaid card, telephone card, smart card, magnetic stripe card, bar code card, transponder, radio frequency card and/or the like having an account number, which cardholders typically present to Service Establishments (SEs), as part of a transaction, such as a purchase. An "account number", as used herein, includes any device, code, number, letter, symbol, digital certificate, smart chip, digital signal, analog signal, biometric or other identifier/indicia suitably configured to allow the consumer to interact or communicate with the system, such as, for example, authorization/access code, personal identification number (PIN), Internet code, other identification code, and/or the like which is optionally located on card. The account number may be distributed and stored in any form of plastic, electronic, magnetic, radio frequency, wireless, audio and/or optical device capable of transmitting or downloading data from itself to a second device. A customer account number may be, for example, a sixteen-digit credit card number, although each credit provider has its own numbering system, such as the fifteen-digit numbering system used by American Express. Each company's credit card numbers comply with that company's standardized format such that the company using a sixteen-digit format will generally use four spaced sets of numbers, as represented by the number "0000 0000 0000 0000". The first five to seven digits are reserved for processing purposes and identify the issuing bank, card type, and etc. In this example, the last sixteenth digit is used as a sum check for the sixteen-digit number. The intermediary eight-to-ten digits are used to uniquely identify the customer.

In various embodiments, an account number may identify a consumer. In addition, in various embodiments, a consumer may be identified by a variety of identifiers, including, for example, an email address, a telephone number, a cookie id, a radio frequency identifier ("RFID"), a biometric, and the like. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof.

The system may include or interface with any of the foregoing accounts, devices, and/or a transponder and reader (e.g. RFID reader) in RF communication with the transponder (which may include a fob), or communications between an initiator and a target enabled by near field communications (NFC). Typical devices may include, for example, a key ring, tag, card, cell phone, wristwatch or any such form capable of being presented for interrogation. Moreover, the system, computing unit or device discussed herein may include a "pervasive computing device," which may include a traditionally non-computerized device that is embedded with a computing unit. Examples may include watches, Internet enabled kitchen appliances, restaurant tables embedded with RF readers, wallets or purses with imbedded transponders, etc. Furthermore, a device or financial transaction instrument may have electronic and communications functionality enabled, for example, by: a network of electronic circuitry that is printed or otherwise incorporated onto or within the transaction instrument (and typically referred to as a "smart card"); a fob having a transponder and an RFID reader; and/or near field communication (NFC) technologies.

Phrases and terms similar to "transaction account" may include any account that may be used to facilitate a financial transaction.

Phrases and terms similar to "financial institution" or "transaction account issuer" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

Phrases and terms similar to "transaction" may include any purchase, exchange, lease, rental, deal, agreement, authorization, settlement, information exchange, item exchange, a record of charge (or "ROC"), record of transaction ("ROT"), including all related data and metadata, and/or the like. Moreover, the transaction, information associated with the transaction, and/or a record associated with the transaction may comprise a unique identifier associated with a transaction. A transaction may, in various embodiments, be performed by one or more account holders using a transaction account. The transaction account may be associated with a transaction instrument such as, for example, a gift card, a debit card, a credit card, and the like. A record associated with the transaction may, in addition, contain details such as location, merchant name or identifier, transaction amount, transaction date, account number, account security pin or code, account expiry date, and the like for the transaction.

Phrases and terms similar to "business" or "merchant" may be used interchangeably with each other and shall mean any person, entity, distributor system, software and/or hardware that is a provider, broker and/or any other entity in the distribution chain of items. For example, a merchant may be a grocery store, a retail store, a travel agency, a service provider, an on-line merchant or the like.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general-purpose digital computers or similar devices.

In various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., Windows operating system, UNIX®, Linux®, Solaris®, MacOS, etc.) as well as various conventional support software and drivers typically associated with computers.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as iPads, iMACs, and MacBooks, kiosks, terminals, point of sale (POS) devices and/or terminals, televisions, or any other device capable of receiving data over a network. A web-client may run Microsoft Internet Explorer®, Mozilla Firefox®, Google® Chrome, Apple® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In an exemplary embodiment, access is through a network or the Internet through a commercially-available web-browser software package.

In various embodiments, components, modules, and/or engines of systems may be implemented as micro-applications or micro-apps. Micro-apps are typically deployed in the context of a mobile operating system, including for example, a Palm® mobile operating system, a Windows® mobile operating system, an Android® Operating System, Apple® iOS, a Blackberry® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein, the term "network" includes any cloud, cloud computing system or communications (e.g., electronic) system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., iPhone®, Palm Pilot®, Blackberry®), cellular phone, kiosk, etc.), online communications, satellite communications, offline communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, Appletalk, IP-6, NetBIOS, OSI, any tunneling protocol (e.g. IPsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any items, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited May 2014), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

Phrases and terms similar to an "item" may include any good, service, information, experience, data, discount, rebate, points, virtual currency, content, access, rental, lease, contribution, account, credit, debit, benefit, right, reward, points, coupons, credits, monetary equivalent, anything of value, something of minimal or no value, monetary value, non-monetary value and/or the like. Moreover, the "transactions" or "purchases" discussed herein may be associated with an item. Furthermore, a "reward" may be an item.

Phrases and terms similar to "transaction" may include any purchase, authorization, settlement, a record of charge (or "ROC"), record of transaction ("ROT") and/or the like. Moreover, the transaction, information associated with the transaction, and/or a record associated with the transaction may comprise a unique identifier associated with a transaction. A transaction may, in various embodiments, be performed by a one or more members using a transaction account, such as a transaction account associated with a transaction account such as, for example, a gift card, a debit card, a credit card, and the like. A record associated with the transaction may, in addition, contain details such as location, merchant name or identifier, transaction amount, transaction date, account number, account security pin or code, account expiry date, and the like for the transaction.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), AJAX (Asynchronous Javascript And XML), helper applications, plug-ins, and the like. A server may include a web service that receives a request from a web server, the request including a URL (http://yahoo.com/stockquotes/ge) and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WebSphere MQTM (formerly MQSeries) by IBM, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

As used herein, the term "end user", "consumer", "customer", "cardmember", "business" or "merchant" may be used interchangeably with each other, and each shall mean any person, entity, government organization, business, machine, hardware, and/or software. A bank may be part of the system, but the bank may represent other types of card issuing institutions, such as credit card companies, card sponsoring companies, or third party issuers under contract with financial institutions. It is further noted that other participants may be involved in some phases of the transaction, such as an intermediary settlement institution, but these participants are not shown.

Each participant is equipped with a computing device in order to interact with the system and facilitate online commerce transactions. The customer has a computing unit in the form of a personal computer, although other types of computing units may be used including laptops, notebooks, hand held computers, set-top boxes, cellular telephones, touch-tone telephones and the like. The merchant has a computing unit implemented in the form of a computer-server, although other implementations are contemplated by the system. The bank has a computing center shown as a main frame computer. However, the bank computing center may be implemented in other forms, such as a mini-computer, a PC server, a network of computers located in the same of different geographic locations, or the like. Moreover, the system contemplates the use, sale or distribution of any items, services or information over any network having similar functionality described herein The merchant computer and the bank computer may be interconnected via a second network, referred to as a payment network. The payment network which may be part of certain transactions represents existing proprietary networks that presently accommodate transactions for credit cards, debit cards, and other types of financial/banking cards. The payment network is a closed network that is assumed to be secure from eavesdroppers. Exemplary transaction networks may include the American Express®, VisaNet® and the Veriphone® networks.

The electronic commerce system may be implemented at the customer and issuing bank. In an exemplary implementation, the electronic commerce system is implemented as computer software modules loaded onto the customer computer and the banking computing center. The merchant computer does not require any additional software to participate in the online commerce transactions supported by the online commerce system.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C.' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described exemplary embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A connectivity contextual services ecosystem management system comprising:
   a connectivity contextual services connectivity system comprising:
      a merchant targeting data database comprising connectivity directives indicating which of a plurality of connectivity contextual services to provide in response to a context environment comprising connectivity context characteristics;
      a connectivity services repository comprising a database of connectivity contextual services; and
      a management engine configured to identify the context environment in response to the connectivity context characteristics and to provide connectivity contextual services from the connectivity services repository in response to the connectivity directives,
   wherein the connectivity services repository communicates with the management engine,
   wherein the management engine provides a user with a dynamic, real-time connectivity contextual services experience in response to the context environment, and
   wherein the management engine performs operations of:
   evaluating, in response to the user at least one of initiating a transaction between a user portable device of the user and a merchant or the user portable device is in range of the merchant, the context environment,
   wherein the context environment includes whether the user portable device entered a store of the merchant, whether the user portable device is located within the store of the merchant, whether the user authorized a payment on the user portable device, whether the user opened an application on the user portable device, and whether the user portable device scanned a SKU for a product;
   determining information about the user portable device involved in the transaction;
   determining information about software on the user portable device that was involved in the transaction;
   determining characteristics of the user conducting the transaction;
   determining characteristics of the transaction;
   determining physical locations of the user, the merchant and location technology;
   determining a type of a promotional input by the merchant;
   determining a date and time of the transaction;
   determining, dynamically and in real-time using machine learning techniques and feedback loops, a promotion applicable to the user based on the context environment, information about the user portable device, the information about software, the characteristics of the user, the characteristics of the transaction, the physical locations of the user, the type of the promotional input, the date of the transaction, the time of the transaction, risk analysis of the user, merchants visited by the user, a transaction history of the user, an amount of spend for the transaction, a frequency of the transaction, a number of transactions, a categorization of the transaction, activities by the user in a social media channel, activities by the user in an entertainment channel, activities by the user in a reservation channel and activities by the user in a review channel;
   determining, dynamically and in real-time using the machine learning techniques and the feedback loops, customized content applicable to the user based on the context environment, the information about the user portable device, the information about software, the characteristics of the user, the characteristics of the transaction, the physical locations of the user portable device, the type of the promotional input, the date of the transaction, the time of the transaction, the risk analysis of the user, merchants visited by the user portable device, the transaction history of the user, the amount of spend for the transaction, the frequency of the transaction, the number of transactions, the categorization of the transaction, activities by the user portable device in a social media channel, activities by the user portable device in an entertainment channel, activities by the user portable device in the reservation channel and activities by the user portable device in the review channel;
   identifying whether the context environment links to a merchant service of the merchant;
   providing, dynamically and in real-time, inventory data to the user portable device for display on the user portable device;
   providing, dynamically and in real-time, the customized content to the user portable device for display on the user portable device;
   providing, dynamically and in real-time, the promotion to the user portable device for display on the user portable device;
   applying, in response to the context environment linking to the merchant service of the merchant, the promotion to the transaction dynamically and in real-time;
   determining, based on the promotion, information about a payment amount for the product;
   distributing the information about the payment amount to the user;
   receiving a transaction authentication comprising a user fingerprint;
   processing the transaction in response to the receiving; and
   transmitting a transaction confirmation.

2. The connectivity contextual services ecosystem management system of claim 1, further comprising a network configured to communicate with the user portable device.

3. The connectivity contextual services ecosystem management system of claim 1 further comprising a network configured to communicate with a merchant device.

4. The connectivity contextual services ecosystem management system of claim 1, wherein the connectivity contextual services comprises at least one of: conversation services, transactional services, display services or authentication services.

5. The connectivity contextual services ecosystem management system of claim 1, wherein the connectivity contextual services comprise conversation services comprising at least one of: two-way real-time chat between the user portable device and a merchant device, delivery of stored messages from the merchant device to the user portable device, or delivery of user instructions from the user portable device to the merchant device.

6. The connectivity contextual services ecosystem management system of claim 5, wherein the conversation services are delivered via a social media channel.

7. The connectivity contextual services ecosystem management system of claim 1, wherein the connectivity contextual services comprise authentication services comprising mechanisms of confirming a user identity comprising at least one of: biometric authentication comprising fingerprinting, a payment card swipe, a pin number, an identification photograph or a user location.

8. The connectivity contextual services ecosystem management system of claim 1, wherein the connectivity context characteristics comprise:
   information provided by third parties comprising at least one of: merchants, social media, credit reporting agencies, or payment processors; and
   user location data comprising at least one of: present user device location, past user portable device location, or changes in the user portable device location.

9. The connectivity contextual services ecosystem management system of claim 1, wherein the context environment comprises triggers, wherein the triggers comprise a user location and a user dormancy status.

10. A method comprising:
   recognizing, by a computer-based system, a merchant device connected to a connectivity contextual services connectivity system;
   identifying, by the computer-based system, an identity of a merchant associated with the merchant device in response to the recognizing;
   receiving, by the computer-based system, a query from a user portable device;
   determining, by the computer-based system, that the merchant associated with the merchant device is a corresponding merchant to the query;
   prioritizing, by the computer-based system, the merchant in a response to the query;
   returning, by the computer-based system dynamically and in real-time, the response to the user portable device;
   identifying, by the computer-based system, a user identity in response to a user confirming the user identity via the user portable device;
   determining, by the computer-based system dynamically and in real-time, connectivity contextual services to deliver to the user portable device and the merchant device in response to the identifying;
   instantiating, by the computer-based system dynamically and in real-time, a user-merchant session and delivering the connectivity contextual services to the user portable device and the merchant device;
   changing, by the computer-based system dynamically and in real-time, the connectivity contextual services delivered to the user portable device and the merchant device in response to the user portable device moving from a first location to a second location;
   evaluating, by the computer-based system dynamically and in real-time, a context environment of the user portable device,
   wherein the context environment includes whether the user portable device entered a store of the merchant, whether the user portable device is located within the store of the merchant, whether the user authorized a payment on the user portable device, whether the user opened an application on the user portable device, and whether the user portable device scanned a SKU for a product;
   determining, by the computer-based system dynamically and in real-time, information about the user portable device involved in a transaction;
   determining, by the computer-based system, information about software on the user portable device that was involved in the transaction;
   determining, by the computer-based system, characteristics of the user conducting the transaction;
   determining, by the computer-based system, characteristics of the transaction;
   determining, by the computer-based system, physical locations of the user, the merchant and location technology;
   determining, by the computer-based system, a type of a promotional input by the merchant;
   determining, by the computer-based system, a date and time of the transaction;
   determining, by the computer-based system dynamically and in real-time using machine learning techniques and feedback loops, a promotion applicable to the user based on the context environment, information about the user portable device, the information about software, the characteristics of the user, the characteristics of the transaction, the physical locations of the user, the type of the promotional input, the date of the transaction, the time of the transaction, risk analysis of the user, merchants visited by the user, a transaction history of the user, an amount of spend for the transaction, a frequency of the transaction, a number of transactions, a categorization of the transaction, activities by the user in a social media channel, activities by the user in an entertainment channel, activities by the user in a reservation channel and activities by the user in a review channel;
   determining, by the computer-based system dynamically and in real-time using the machine learning techniques and the feedback loops, customized content applicable to the user based on the context environment, the information about the user portable device, the information about software, the characteristics of the user, the characteristics of the transaction, the physical locations of the user portable device, the type of the promotional input, the date of the transaction, the time of the transaction, the risk analysis of the user, merchants visited by the user portable device, the transaction history of the user, the amount of spend for the transaction, the frequency of the transaction, the number of transactions, the categorization of the transaction, activities by the user portable device in a social media channel, activities by the user portable device in an entertainment channel, activities by the user portable device in the reservation channel and activities by the user portable device in the review channel;
   identifying, by the computer-based system, whether the context environment links to a merchant service of the merchant;
   providing, by the computer-based system dynamically and in real-time, inventory data to the user portable device for display on the user portable device;
   providing, by the computer-based system dynamically and in real-time, the customized content to the user portable device for display on the user portable device;
   providing, by the computer-based system, the promotion to the user portable device for display on the user portable device;
   applying, by the computer-based system and in response to the context environment linking to the merchant service of the merchant, the promotion to the transaction dynamically and in real-time;
   determining, by the computer-based system and based on the promotion, information about payment amount for the product;
   distributing, by the computer-based system, the information about the payment amount to the user;
   receiving, by the computer-based system, a transaction authentication comprising a user fingerprint;

processing, by the computer-based system, the transaction in response to the receiving; and transmitting, by the computer-based system, a transaction confirmation.

11. The method according to claim 10, wherein the connectivity contextual services comprise conversation services.

12. The method according to claim 11, wherein the conversation services are delivered via a social media channel.

13. The method according to claim 10, wherein the identifying the user identity further comprises determining a location of the user.

14. The method according to claim 10, wherein the first location is outside a premises of the merchant and the second location is inside the premises of the merchant.

15. The method according to claim 10, wherein the second location is outside a premises of the merchant and the first location is inside the premises of the merchant.

16. A non-transitory computer program product having computer-executable instructions stored thereon that, if executed by a computer-based system, causes the computer-based system to be capable of performing operations comprising:

recognizing, by the computer-based system, a merchant device connected to a connectivity contextual services connectivity system;

identifying, by the computer-based system, an identity of a merchant associated with the merchant device in response to the recognizing;

receiving, by the computer-based system, a query from a user portable device;

determining, by the computer-based system, that the merchant associated with the merchant device is a corresponding merchant to the query;

prioritizing, by the computer-based system, the merchant in a response to the query;

returning, by the computer-based system dynamically and in real-time, the response to the user portable device;

identifying, by the computer-based system, a user identity in response to a user confirming the user identity via the user portable device;

determining, by the computer-based system dynamically and in real-time, connectivity contextual services to deliver to the user portable device and the merchant device in response to the identifying;

instantiating, by the computer-based system dynamically and in real-time, a user-merchant session and delivering the connectivity contextual services to the user portable device and the merchant device;

changing, by the computer-based system dynamically and in real-time, the connectivity contextual services delivered to the user portable device and the merchant device in response to the user portable device moving from a first location to a second location;

evaluating, by the computer-based system dynamically and in real-time, a context environment of the user portable device, wherein the context environment includes whether the user portable device entered a store of the merchant, whether the user portable device is located within the store of the merchant, whether the user authorized a payment on the user portable device, whether the user opened an application on the user portable device, and whether the user portable device scanned a SKU for a product;

determining, by the computer-based system dynamically and in real-time, information about the user portable device involved in a transaction;

determining, by the computer-based system, information about software on the user portable device that was involved in the transaction;

determining, by the computer-based system, characteristics of the user conducting the transaction;

determining, by the computer-based system, characteristics of the transaction;

determining, by the computer-based system, physical locations of the user, the merchant and location technology;

determining, by the computer-based system, a type of a promotional input by the merchant;

determining, by the computer-based system, a date and time of the transaction;

determining, by the computer-based system dynamically and in real-time using machine learning techniques and feedback loops, a promotion applicable to the user based on the context environment, information about the user portable device, the information about software, the characteristics of the user, the characteristics of the transaction, the physical locations of the user, the type of the promotional input, the date of the transaction, the time of the transaction, risk analysis of the user, merchants visited by the user, a transaction history of the user, an amount of spend for the transaction, a frequency of the transaction, a number of transactions, a categorization of the transaction, activities by the user in a social media channel, activities by the user in an entertainment channel, activities by the user in a reservation channel and activities by the user in a review channel;

determining, by the computer-based system dynamically and in real-time using the machine learning techniques and the feedback loops, customized content applicable to the user based on the context environment, the information about the user portable device, the information about software, the characteristics of the user, the characteristics of the transaction, the physical locations of the user portable device, the type of the promotional input, the date of the transaction, the time of the transaction, the risk analysis of the user, merchants visited by the user portable device, the transaction history of the user, the amount of spend for the transaction, the frequency of the transaction, the number of transactions, the categorization of the transaction, activities by the user portable device in a social media channel, activities by the user portable device in an entertainment channel, activities by the user portable device in the reservation channel and activities by the user portable device in the review channel;

identifying, by the computer-based system, whether the context environment links to a merchant service of the merchant;

providing, by the computer-based system dynamically and in real-time, inventory data to the user portable device for display on the user portable device;

providing, by the computer-based system dynamically and in real-time, the customized content to the user portable device for display on the user portable device;

providing, by the computer-based system, the promotion to the user portable device for display on the user portable device;

applying, by the computer-based system and in response to the context environment linking to the merchant service of the merchant, the promotion to the transaction dynamically and in real-time;

determining, by the computer-based system and based on the promotion, information about payment amount for the product;

distributing, by the computer-based system, the information about the payment amount to the user;

receiving, by the computer-based system, a transaction authentication comprising a user fingerprint;

processing, by the computer-based system, the transaction in response to the receiving; and transmitting, by the computer-based system, a transaction confirmation.

17. The non-transitory computer program product according to claim 16, wherein the connectivity contextual services comprise conversation services.

18. The non-transitory computer program product according to claim 17, wherein the conversation services are delivered via a social media channel.

19. The non-transitory computer program product according to claim 16, wherein the identifying the user further comprises determining a location of the user.

20. The non-transitory computer program product according to claim 16, wherein the first location is outside a premises of the merchant and the second location is inside the premises of the merchant.

* * * * *